US00RE43474E

(19) United States
(12) Reissued Patent
Majoor

(10) Patent Number: US RE43,474 E
(45) Date of Reissued Patent: Jun. 12, 2012

(54) MECHANISM AND METHOD FOR SPECIFIED TEMPORAL DEPLOYMENT OF RULES WITHIN A RULE SERVER

(75) Inventor: Johannes W. F. Majoor, San Francisco, CA (US)

(73) Assignee: Fair Isaac Corporation, Minneapolis, MN (US)

(21) Appl. No.: 11/854,404

(22) Filed: Sep. 12, 2007

Related U.S. Patent Documents

Reissue of:
(64) Patent No.: 6,944,604
Issued: Sep. 13, 2005
Appl. No.: 09/898,908
Filed: Jul. 3, 2001

(51) Int. Cl.
*G06F 17/00* (2006.01)
*G06N 5/02* (2006.01)

(52) U.S. Cl. ..... 706/47
(58) Field of Classification Search ..... 706/47
See application file for complete search history.

(56) References Cited

U.S. PATENT DOCUMENTS

| | | | | |
|---|---|---|---|---|
| 5,701,400 | A * | 12/1997 | Amado | 706/45 |
| 6,101,440 | A * | 8/2000 | Wagner et al. | 701/67 |
| 6,438,591 | B1 * | 8/2002 | Fehskens et al. | 709/223 |
| 6,449,598 | B1 * | 9/2002 | Green et al. | 705/2 |
| 2002/0169982 | A1 * | 11/2002 | Brock et al. | 713/201 |

* cited by examiner

*Primary Examiner* — Jeffrey A Gaffin
*Assistant Examiner* — Li-Wu Chang
(74) *Attorney, Agent, or Firm* — Mintz, Levin, Cohn, Ferris, Glovsky and Popeo, P.C.

(57) ABSTRACT

An improved method and mechanism for specified temporal deployment of rules within a rules server. A rules server applies a set of rules, stored within a rulebase, to a given set of input values or parameters. Each rule is associated with a start time and an end time. Upon receiving a transaction request, a transaction time is determined for the transaction request. Subsequently, a set of effective rules within the ruleset are identified by the rules server, wherein each effective rule has a start time before the transaction time, and an end time that is after the transaction time. The rule server applies only the set of effective rules to the transaction.

14 Claims, 3 Drawing Sheets

MECHANISM AND METHOD FOR SPECIFIED TEMPORAL DEPLOYMENT OF RULES WITHIN A RULE SERVER

Matter enclosed in heavy brackets [ ] appears in the original patent but forms no part of this reissue specification; matter printed in italics indicates the additions made by reissue.

FIELD OF THE INVENTION

The invention relates generally to the field of transaction processing and more specifically to the operation of a rule server.

BACKGROUND AND SUMMARY

The present invention relates generally to computer systems that utilize rules-based mechanisms to facilitate or implement an application or business process. A type of system that often uses a rules-based approach is an expert system or knowledge-based system, which attempts to mimic the thought process that an expert would utilize to address tasks in a particular field. Computer systems that employ rules-based mechanisms, e.g. experts systems, are employed in a wide variety of settings, such as computer systems that bank loan officers use for guidance in approving and rejecting loan applications. Other examples of disciplines in which rules-based based systems are used include automobile repair, medical diagnosis, oil exploration, financial planning, chemical analysis, surgery, weather prediction, computer repair, computer system configuration, operation of nuclear plants, interpreting government regulations, tax preparation, as well as many others.

A typically rules-based approach employs one or more sets of rules ("rulesets") that define actions or results that occur upon specified input values or parameters. A rule server is a computing device that performs the functionality of applying a set of rules to a given set of input values or parameters. An exemplary rules-based product embodying this approach is the Blaze Advisor™product available from HNC Software, Inc. of San Diego, Calif.

One advantage of the rules-based approach is that the composition of rules defined in a ruleset may be changed over time with the evolution of a business processes or to reflect a new procedure. Commonly, rules are adjusted in a rule server by maintaining multiple rulebases. A rulebase is a component that stores one or more rulesets. Administrators effect changes to one or more rules stored within a rulebase not being used by the rule server, and then swap it for the rulebase in operation at the time the new rules are desired to be deployed. End-users accessing to the rule server thereafter are processed using the rulebase with the new changes. The clear drawback to this approach is the overhead involved in swapping rulebases. Further, prior versions of the rulebases are not saved or operatively connected, so it is difficult to determine how a rule server would have processed input at an earlier point in time prior to when the current rulebase was operational.

Therefore, it is desirable to implement a method and mechanism for upgrading one or more sets of rules without taking a rule server offline. The present invention provides an improved mechanism for "freshness dating" of a rule server. In an embodiment, the present invention provides a method for operating a rules server that comprises a rulebase, wherein the rulebase comprises one or more rules, by (a) associating at least one rule of the one or more rules with a start time and an end time; (b) receiving a transaction request; (c) determining a transaction time for the transaction request; and (d) determining a set of one or more currently operational rules in the one or more rules for the transaction request, wherein the transaction time for the transaction request is after the start time associated with each of the set of one or more currently operational rules, and the transaction time for the transaction request is before the end time associated with each of the one or more currently operational rules. Note that the principles disclosed herein are equally applicable to perform update operations for other types of computer systems. Further details of aspects, objects, and advantages of the invention are described below in the detailed description, drawings, and claims.

BRIEF DESCRIPTION OF THE DRAWINGS

The present invention is illustrated by way of example, and not by limitation, in the figures of the accompanying drawings and which like reference numerals refer to similar elements and in which.

DETAILED DESCRIPTION OF EMBODIMENT(S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
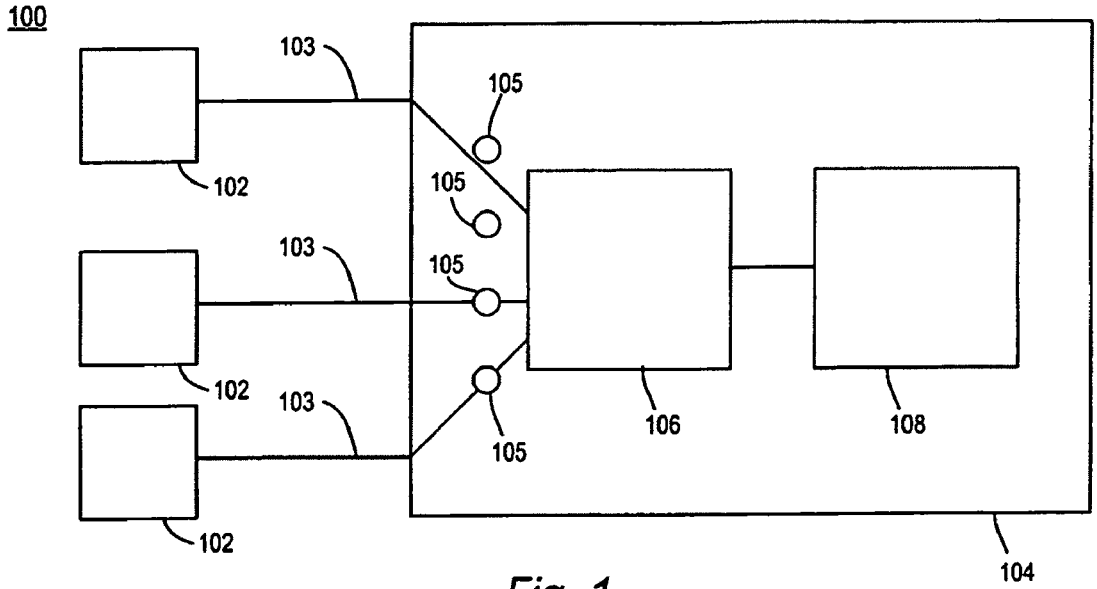
FIG. 1 is a functional block diagram illustrating a rule-based system 100 according to one embodiment of the present invention.

The present invention provides an improved method and mechanism for changing rules in a rules-based computing system and for effecting the new or revised rules without swapping rulesets in a rule server. FIG. 1 shows a rules-based system 100 according to an embodiment of the invention. In the rules-based system 100 of FIG. 1, a client 102 of a computer-based application connects to a rule server 104 to perform a rules-driven operation. The client 102 may be either a local client or a remote client that connects via a network connection 103. The rule server 104 comprises or is operatively connected to a rulebase 108 that contains one or more rulesets. A rule engine 106 is the mechanism that applies a selected ruleset to an input received from client 102 to generate a set of results.

The rule server 104 includes processing entities to perform work on behalf of clients 102. Various types of processing entities are usable in the invention, such as processes, threads, or agents. Such processing entities are referred to herein as rule service agents 105. The rule server 104 can be configured to provide a pool of rule service agents 105 to handle service requests on behalf of clients 102. Multiple rule service agents 105 are available to handle service requests in parallel from multiple clients 102. Even with only a single rule service agent 105 available, concurrent client requests can be handled using a queuing arrangement for client requests. In an embodiment, a single dedicated rule service agent 105 performs service requests on behalf of a single client. In an alternate embodiment, a single rule service agent 105 can process service requests on behalf on multiple clients. Rule service agents 105 are operatively connected to the rule engine 106.

The present invention permits rules to be stored within a rulebase 108 that are not currently effective. The present invention provides a mechanism for associating a valid start date and stop date for each rule within a rulebase 108 such that the rule is only employed by the rule server 104 if the date to employ the rule is any date between the start date and the stop date, i.e. when the rule is currently effective.

Figure 2:
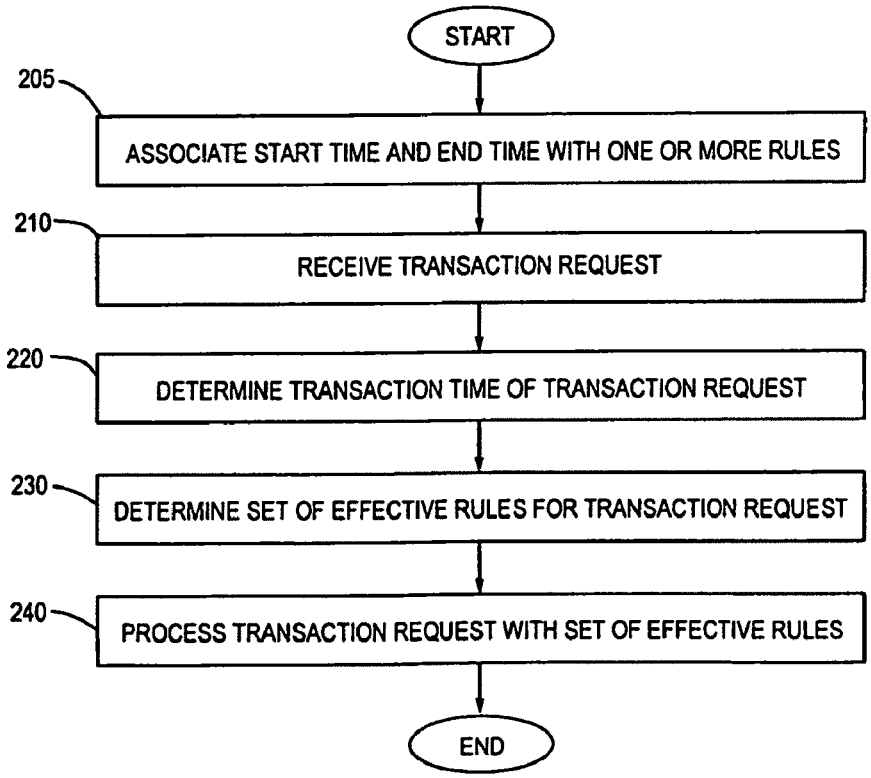
FIG. 2 is a flow-chart illustrating the functional steps of an embodiment of the invention.
Figure 4A:
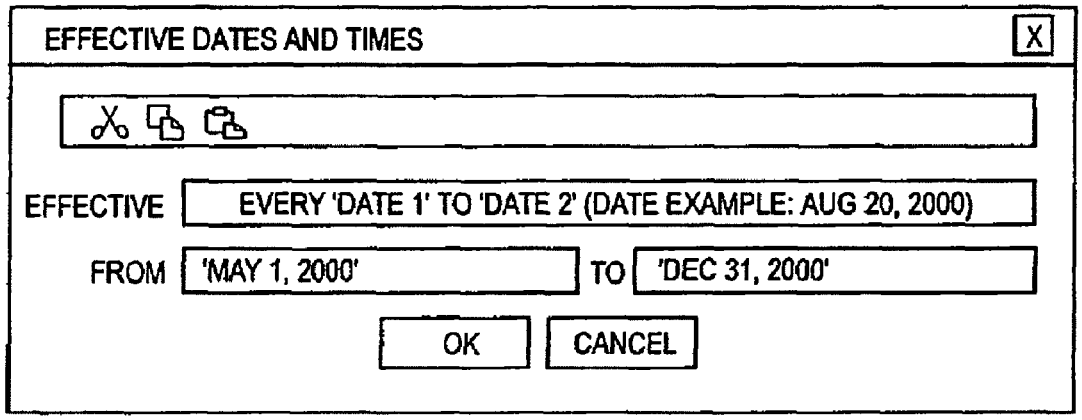
FIG. 4A is a pictorial representation of a graphical user interface for specifying a start time and an end time according to an embodiment of the invention.

The functional steps performed by embodiments of the invention will now be explained with reference to FIG. 2, which is a flow-chart illustrating the functional steps of an embodiment of the invention. Initially, according to embodiments of the invention, an administrator of the rule server 104 associates a start time and an end time with one or more rules 205 within the rulebase 108. A start time is the moment in time when the particular rule becomes effective, and the end time is the moment in time when the particular rule is no longer effective. The term "effective" in this context means that the particular rule will be applied by the rule engine 106. In other words, when a transaction request is received by a rule server 104, only rules in effect, referred to herein interchangeably as effective rules, contained within the rulebase 108 will be employed by the rule server 104. The administrator may associate a start time and an end time with each rule through a variety of well established means of applying input to a rule server 104. In an embodiment of the invention, the administrator associates a start time and an end time through a graphical user interface, such as the one illustrated in FIG. 4A.

Figure 4B:
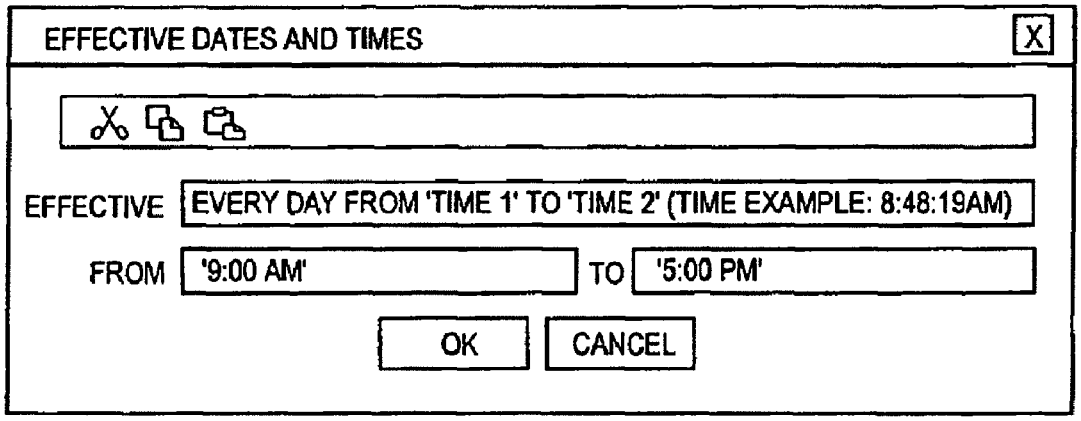
FIG. 4B is a pictorial representation of a graphical user interface for specifying a start time and an end time according to another embodiment of the invention.

The start times and stop times governing the effectiveness of rules within a rulebase 108 may be arbitrarily complex. For example, in the embodiment illustrated in FIG. 4A, the start and stop times may be whole days, e.g., a rule effective from May 1 to Dec. 31, 2001. In other embodiments of the invention, rules can be effective for a duration expressed in a finer granularity, such as a time interval expressed in hours, minutes, or seconds, e.g., a rule effective from 9:01:00 AM EDT to 4:59:59 PM EDT. In other embodiments of the invention, the a periodic effective range may be specified. A periodic effective range is desirable when a rule is used in regular intervals, e.g., a rule effective during normal business hours. A graphical user interface for specifying start and stop times according to this embodiment is illustrated in FIG. 4B. According to other embodiments of the invention, the start and stop times are adjusted to consider the time zones of the rule server 104 and its clients 102. For example, suppose a rule has an effective time set to 9:00 AM to 5:00 PM local time. If the rules are being processed by a rule server 104 in San Francisco (which is in Pacific Standard time), and the client 102 initiates the transaction request from Singapore, the time of the transaction may be adjusted to reflect the local time in Singapore at the time the transaction was initiated. According to other embodiments of the invention, the start times and stop times of rules may be dependent upon external events specified by the administrator. For example, a rule may be specified to stop when a particular marketing campaign is over or a specified special offer is concluded.

Subsequently, a transaction request is received 210 according to an embodiment of the invention. The transaction request, initiated by a client 102, is transmitted to the rule server 104 over the network connection 103. The transaction request is processed once received by the rule server 104 by rule server agents 105. Rule server agents 105 subsequently transfer the request to an appropriate rule engine 106 for processing.

After the rule server 104 receives the transaction request, the rule server 104 determines the transaction time of transaction request 220. The rule server agents 105 or the rule engine 106 may perform this action. Consequently, the function of determining the transaction time may be performed by numerous functional components of the rule server 104, and the present invention is not limited to which particular component performs this function. In embodiments of the invention, the transaction time of the transaction request is determined once when the rule server 104 receives the transaction request. In another embodiment of the invention, the transaction time is repeatedly determined after the expiration of a specified length of time. For example, the transaction time of the transaction request may be calculated after every second or every millisecond. The administrator of the rule server 108 may specify such length of time through a graphical user interface, such as a web page, operatively connected to the rule server 104. In embodiments of the invention, defaults may be assigned to the start time and end time in appropriate circumstances. For example, an unspecified start time may be defaulted to being equivalent to the current time, thus taking effect immediately. The administrator of the rule server 104 may program the rule server 104 to evaluate certain input values, or lack thereof, with specified default values.

After determining the transaction time of a transaction request, a set of effective rules within the rulebase 108 are determined 230. The rule server 104 includes within the set of effective rules those rules in the rulebase 108 that have a start time before the transaction time, and an end time after the transaction time. According to embodiments of the invention, the rule engine 106 determines the set of effective rules. According to other embodiments of the invention, the rulebase 108 determines the set of effective rules. Consequently, it is contemplated that different components of the rule server 104 may determine the set of effective rules.

The rule server processes the transaction request with the set of effective rules 240 after determining the set of effective rules within the rulebase 108. If the set of effective rules changes before a transaction is complete, which is possible when the transaction time of a transaction request is determined at periodic intervals, then the most recent set of effective rules is used by the rule server 104.

Embodiments of the invention advantageously provide for removing the overhead traditionally associated with managing rules within a rulebase 108 which become effective at different points in time. Accordingly, by providing for rules to be stored within a single rulebase 108, with rules that become effective at different points in time, version control of the rules is simplified. Further, outdated rules that are no longer effective may co-exist in the same rulebase 108 as the current versions of the same rules.

Embodiments of the invention also advantageously provide for a historical perspective of rules in the rulebase 108. In other words, one may view the rules within a rulebase 108 to determine the effective rules at a particular moment in time, whether that point in time is in the past, present, or future. As such, in embodiments of the invention, input to the rule server 104 may be processed from a set of rules that are effective at a different moment in time other than the current time. This is desirable because the behavior of the rule server 104 may be tested at any point in time, because rules governing the behavior of the rule server 104 are accessible. In such embodiments, the transaction time used to test the rule server 104 at different times other than the current time may be specified by an administrator through a variety of well known input mechanisms to a rule server 104, such as, e.g., a graphical user interface.

A rules server 100 may be implemented according to embodiments of the invention on a computer system 300. In an embodiment of the invention, execution of the sequences of instructions required to practice the invention is performed by a single computer system 300. According to other embodiments of the invention, two or more computer systems 300 coupled by a communication link 315 may perform the sequence of instructions required to practice the invention in coordination with one another. In order to avoid needlessly obscuring the invention, a description of only one computer system 300 will be presented below; however, it should be understood that any number of computer systems 300 may be employed to practice the invention.

Figure 3:
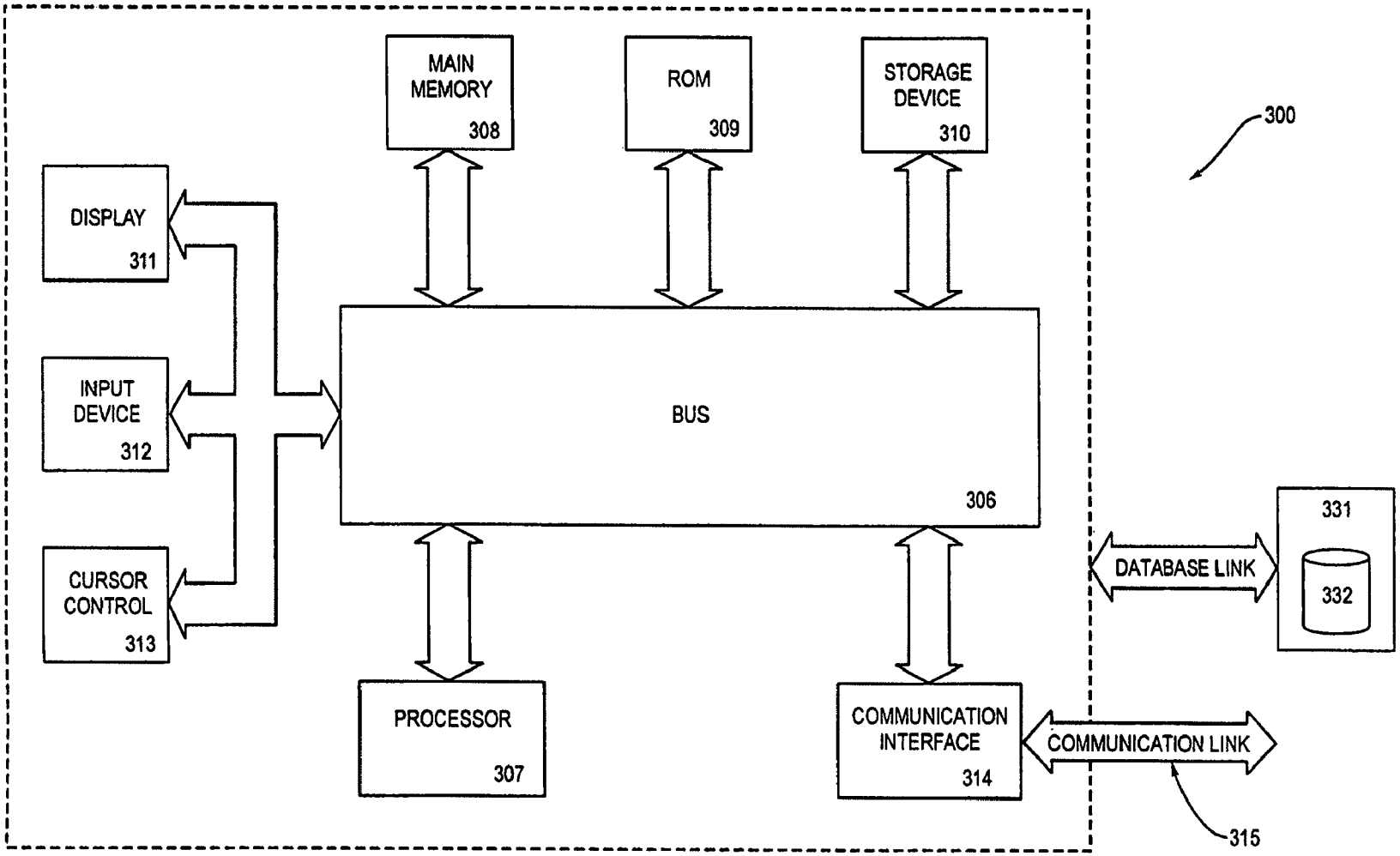
FIG. 3 is a diagram of a system architecture of which the present invention may be implemented.

A computer system 300 according to an embodiment of the invention will now be described with reference to FIG. 3, which is a block diagram of the functional components of a computer system 300 according to an embodiment of the invention. As used herein, the term computer system 300 is broadly used to describe any computer that can store and independently run one or more programs, e.g., a personal computer, a server computer, a portable laptop computer, or a personal data assistants ("PDA").

Each computer system 300 may include a communication interface 314 coupled to the bus 306. The communication interface 314 provides two-way communication between computer systems 300. The communication interface 314 of a respective computer system 300 transmits and receives electrical, electromagnetic or optical signals that include data streams representing various types of information, including instructions, messages and data. A communication link 315 links one computer system 300 with another computer system 300. The communication link 315 may be a LAN, in which case the communication interface 314 may be a LAN card. Alternatively, the communication link 315 may be a PSTN, in which case the communication interface 314 may be an integrated services digital network (ISDN) card or a modem. Also, as a further alternative, the communication link 315 may be a wireless network.

A computer system 300 may transmit and receive messages, data, and instructions, including program, i.e., application, code, through its respective communication link 315 and communication interface 314. Received program code may be executed by the respective processor(s) 307 as it is received, and/or stored in the storage device 310, or other associated non-volatile media, for later execution. In this manner, a computer system 300 may receive messages, data and/or program code in the form of a carrier wave.

In an embodiment, the computer system 300 operates in conjunction with a data storage system 331, wherein the data storage system 331 contains a database 332 that is readily accessible by the computer system 300. In alternative embodiments, the database 332 may be stored on another computer system 300, e.g., in a memory chip and/or hard disk. In yet alternative embodiments, the database 332 may be read by the computer system 300 from one or more floppy disks, CD-ROMs, or any other medium from which a computer can read. In an alternative embodiment, the computer system 300 can access two or more databases 332, stored in a variety of mediums, as previously discussed.

A computer system 300 includes a bus 306 or other communication mechanism for communicating instructions, messages and data, collectively, information, and one or more processors 307 coupled with the bus 306 for processing information. A computer system 300 also includes a main memory 308, such as a random access memory (RAM) or other dynamic storage device, coupled to the bus 306 for storing dynamic data and instructions to be executed by the processor (s) 307. The main memory 308 also may be used for storing temporary data, i.e., variables, or other intermediate information during execution of instructions by the processor(s) 307.

A computer system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307.

A computer system 300 may be coupled via the bus 306 to a display device 311, such as, but not limited to, a cathode ray tube (CRT), for displaying information to a user. An input device 312, including alphanumeric and other keys, is coupled to the bus 306 for communicating information and command selections to the processor(s) 307. Another type of user input device may include a cursor control 313, such as, but not limited to, a mouse, a trackball, a fingerpad, or cursor direction keys, for communicating direction information and command selections to the processor(s) 307 and for controlling cursor movement on the display 311.

According to one embodiment of the invention, an individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 307. Such a medium may take many forms, including, but not limited to, non-volatile, volatile and transmission media. Non-volatile media, i.e., media that can retain information in the absence of power, includes the ROM 309. Volatile media, i.e., media that can not retain information in the absence of power, includes the main memory 308. Transmission media includes coaxial cables, copper wire and fiber optics, including the wires that comprise the bus 306. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Various forms of computer-usable media may be involved in providing one or more sequences of one or more instructions to the processor(s) 307 for execution. For example, the instructions may initially be provided on a magnetic disk of an external computer system 300 (not shown). The external computer system 300 may load the instructions into its dynamic memory and then transit them over a telephone line, using a modem. A modem coupled to the local computer system 300 may receive the instructions on a telephone line and use an infrared transmitter to convert the instruction signals transmitted over the telephone line to corresponding infrared signals. An infrared detector (not shown) coupled to the bus 306 may receive the infrared signals and place the instructions therein on the bus 306. The bus 306 may carry the instructions to the main memory 308, from which the processor(s) 307 thereafter retrieves and executes the instructions. The instructions received by the main memory 308 may optionally be stored on the storage device 310, either before or after their execution by the processor(s) 307.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

I claim:

1. A method for processing transactions, comprising:

operating a rules server, wherein said rules server comprises a single rulebase, wherein said rulebase comprises one or more rules;

associating at least one rule of said one or more rules with a start time and an end time;

receiving a transaction request for a transaction;

determining a transaction time for said transaction request, including automatically adjusting said transaction time to reflect a local time of said transaction request; and determining a set of one or more effective rules for said transaction request from said at least one rule of said one or more rules associated with said start time and said end time, wherein said transaction time for said transaction request is after said start time associated with each of said set of one or more effective rules, and said transaction time for said transaction request is before said end time associated with each of said one or more effective rules;

wherein said rulebase is configured to store one or more *corresponding* versions *of each rule* of said one or more rules, including outdated rules;

wherein said rule server can be tested at any point in time, *whether that point in time is in the past, present, or future,* by an administrator specifying a testing time other than a current time, said testing time determining effective rules for testing; and wherein if said one or more effective rules changes before said transaction is complete, then a most recent set of effective rules is used by said rule server.

2. The method of claim 1, further comprising the step of:

processing said transaction request with said set of one or more effective rules.

3. The method of claim 1, wherein said step of determining a transaction time for said transaction request is performed once each time said transaction request is received.

4. The method of claim 1, wherein said step of determining a transaction time for said transaction request is performed repeatedly after a specified length of time.

5. The method of claim 1, wherein said rulebase contains one or more rules that are not in said set of one or more effective rules.

6. The method of claim 1, wherein said start time and said end time is specified by an administrator through a graphical user interface.

7. The method of claim 1, wherein said transaction time is determined by an administrator.

8. A *non-transitory* computer-readable medium having thereon instructions for performing a process for processing transactions, said process comprising:

operating a rules server, wherein said rules server comprises a single rulebase, wherein said rulebase comprises one or more rules;

associating at least one rule of said one or more rules with a start time and an end time;

receiving a transaction request for a transaction;

determining a transaction time for said transaction request, including automatically adjusting said transaction time to reflect a local time of said transaction request; and determining a set of one or more effective rules for said transaction request from said at least one rule of said one or more rules associated with said start time and said end time, wherein said transaction time for said transaction request is after said start time associated with each of said set of one or more effective rules, and said transaction time for said transaction request is before said end time associated with each of said one or more effective rules;

wherein said rulebase is configured to store one or more versions of said one or more rules, including outdated rules;

wherein said rule server can be tested at any point in time, *whether that point in time is in the past, present, or future,* by an administrator specifying a testing time other than a current time, said testing time determining effective rules for testing; and wherein if said one or more effective rules changes before said transaction is complete, then a most recent set of effective rules is used by said rule server.

9. The computer-readable medium of claim 8, further comprises that step of:

processing said transaction request with said set of one or more effective rules.

10. The computer-readable medium of claim 8, wherein said step of determining a transaction time for said transaction request is performed once each time said transaction request is received.

11. The computer-readable medium of claim 8, wherein said stop of determining a transaction time for said transaction request is performed repeatedly after a specified length of time.

12. The computer-readable medium of claim 8, wherein said rulebase contains one or more rules that are not in said set of one or more effective rules.

13. The computer-readable medium of claim 8, wherein said start time and said end time is specified by an administrator through a graphical user interface.

14. The computer-readable medium of claim 8, wherein said transaction time is determined by an administrator.

* * * * *